US00RE43600E

(19) United States
(12) Reissued Patent
Ozawa et al.

(10) Patent Number: US RE43,600 E
(45) Date of Reissued Patent: Aug. 21, 2012

(54) EXTERNAL STORAGE CONTROL DEVICE AND DATA TRANSFER METHOD BETWEEN EXTERNAL STORAGE CONTROL DEVICES

(75) Inventors: Koji Ozawa, Odawara (JP); Kazuhide Sano, Odawara (JP); Takeshi Koide, Yokohama (JP); Katsunori Nakamura, Odawara (JP)

(73) Assignee: Hitachi, Ltd., Tokyo (JP)

(21) Appl. No.: 10/614,808

(22) Filed: Jul. 9, 2003

Related U.S. Patent Documents

Reissue of:
(64) Patent No.: 6,470,432
Issued: Oct. 22, 2002
Appl. No.: 09/987,095
Filed: Nov. 13, 2001

U.S. Applications:
(60) Continuation of application No. 09/375,357, filed on Aug. 17, 1999, now Pat. No. 6,321,292, which is a division of application No. 08/779,471, filed on Jan. 8, 1997, now Pat. No. 5,978,890.

(30) Foreign Application Priority Data

Jan. 10, 1996 (JP) ..... 8-002050

(51) Int. Cl.
*G06F 12/00* (2006.01)
(52) U.S. Cl. ..... 711/112
(58) Field of Classification Search ..... None
See application file for complete search history.

(56) References Cited

U.S. PATENT DOCUMENTS 3,990,055 A 11/1976 Henderson et al.
4,451,884 A 5/1984 Heath et al.
4,974,197 A 11/1990 Blount et al.
5,155,845 A 10/1992 Beal et al.
(Continued)

FOREIGN PATENT DOCUMENTS

EP 0 569 313 11/1993
(Continued)

OTHER PUBLICATIONS

EMC Corporation "Symmetrix ICDA Family Product Announcement Summary", Nov. 6, 1995 of EMC Corporation, pp. 1-23.

(Continued)

*Primary Examiner* — Brian Peugh
(74) *Attorney, Agent, or Firm* — Brundidge & Stanger, P.C.

(57) ABSTRACT

In a data processing system in which main and sub disk storage devices are under the control of individual each disk control devices, the write processing time is reduced by selectively sending data according to the command-chaining time between main and sub disk control devices. A section for judging cable length and function of the sub disk control device 36 estimates command-chaining time between a pair of main and sub disk storage devices. The channel command analyzing section 31 estimates the number of records to be transferred and the length of a record using a LOCATE RECORD command. The command judgment section for the sub disk control device 32 optimizes the command-chain to be issued to the sub disk control device using the above-mentioned information. Then, the section for issuing command to the sub disk control device 35 issues the optimized command chain. Thus, a shorter transmission time is realized by either sending individual records or an entire track of data.

29 Claims, 6 Drawing Sheets

U.S. PATENT DOCUMENTS

| | | | | |
|---|---|---|---|---|
| 5,206,939 | A | | 4/1993 | Yanai et al. |
| 5,235,690 | A | | 8/1993 | Beardsley et al. |
| 5,247,665 | A | | 9/1993 | Matsuda et al. |
| 5,430,866 | A | * | 7/1995 | Lawrence et al. ..... 714/20 |
| 5,572,699 | A | | 11/1996 | Kamo et al. |
| 5,588,012 | A | | 12/1996 | Olzumi |
| 5,613,155 | A | | 3/1997 | Baldiga et al. |
| 5,625,840 | A | | 4/1997 | Numata et al. |
| 5,644,787 | A | | 7/1997 | Nakamura et al. |
| 5,680,640 | A | | 10/1997 | Ofek et al. |
| 5,740,465 | A | | 4/1998 | Matsunami et al. |
| 5,802,345 | A | | 9/1998 | Matsunami et al. |
| 5,835,954 | A | | 11/1998 | Duyanovich et al. |
| 5,896,548 | A | | 4/1999 | Ofek |
| 5,901,327 | A | | 5/1999 | Ofek |
| 5,940,865 | A | | 8/1999 | Ohzora et al. |
| 5,978,890 | A | | 11/1999 | Ozawa et al. |
| 5,996,045 | A | | 11/1999 | Lee et al. |
| 6,003,114 | A | | 12/1999 | Bachmat |
| 6,230,239 | B1 | | 5/2001 | Sakaki et al. |
| 6,240,494 | B1 | | 5/2001 | Nagasawa et al. |
| 6,640,291 | B2 | | 10/2003 | Fujibayashi et al. |

FOREIGN PATENT DOCUMENTS

| | | |
|---|---|---|
| EP | 0 656 588 | 6/1995 |
| EP | 0 670 551 | 9/1995 |
| JP | 58-151660 | 9/1983 |
| JP | 58-219656 | 12/1983 |
| JP | 64033770 | 2/1989 |
| JP | 02-059934 | 2/1990 |
| JP | 03-204023 | 9/1991 |
| JP | 06-067811 | 3/1994 |
| JP | 06-250795 | 9/1994 |
| JP | 07-191811 | 7/1995 |
| JP | 7-201132 | 8/1995 |
| JP | 7-271521 | 10/1995 |
| JP | 08-509565 | 10/1996 |
| JP | 09-325863 | 12/1997 |

OTHER PUBLICATIONS

Search Report in European Patent Application No. 03008580.7-1245/1333371 mailed Oct. 28, 2009.

* cited by examiner

EXTERNAL STORAGE CONTROL DEVICE AND DATA TRANSFER METHOD BETWEEN EXTERNAL STORAGE CONTROL DEVICES

Matter enclosed in heavy brackets [ ] appears in the original patent but forms no part of this reissue specification; matter printed in italics indicates the additions made by reissue.

This is a continuation application of U.S. Ser. No. 09/375,357 filed Aug. 17, 1999, now U.S. Pat. No. 6,321,292, which is a divisional application of U.S. Ser. No. 08/779,471 filed Jan. 8, 1997, now U.S. Pat. No. 5,978,890 issued Nov. 2, 1999. The entire contents of these prior applications are hereby incorporated herein by reference.

FIELD OF THE INVENTION

The present invention relates to an external storage control device which stores data to an external storage device according to a write command from a host. In particular, the present invention relates to a system in which the same data is copied to another external storage device.

BACKGROUND OF THE INVENTION

When data used in a host are stored to plural external storage devices, main and sub external storage devices that hold the same data are sometimes provided under individual external storage control devices. In this case, these external storage control devices are mutually connected, and the main external storage control device issues a write command to the external storage control device which controls sub external storage devices when the external storage control device which controls main external storage devices receives a write command. Thus, data stored in the main and sub external storage devices are duplicated.

U.S. Pat. No. 5,155,845 discloses a method in which an external storage control device which controls main external storage devices and one which controls sub external storage devices are mutually connected. A main external storage control device which has received a write command from a host, transfers data to a sub external storage control device. Thus, the write process is performed in parallel for both of main and sub external storage devices.

SUMMARY OF THE INVENTION

When a host handles data stored in external storage devices with CKD (count, key, data) format as used in large scale computer systems, the host issues channel commands in succession for instructing data transfer of each individual record. Thus, each individual record undergoes the same command chaining sequence in order to be transferred.

FIG. 3 illustrates a case of plural records being written using the same command chaining sequence. This Figure illustrates the case in which plural records are written in succession by a single command-chaining. In an external storage sub-system having main and sub external storage devices that hold the same data, located under individual external storage control devices, when a channel device that is a host issues a command-chain (DEFINE EXTENT/LOCATE RECORD/WRITE(R1)/WRITE(R2)/WRITE (R3)) to write 3 successive records R1, R2, and R3 to a disk storage device that is under a main external storage control device, data flow between the channel device and the main external storage control device and between the main external storage control device and the sub external storage control device are shown in the processing sequences of FIG. 3. Thus, several command-chains between the main and sub external storage control devices for each data transfer of write records is executed.

Further, in case data is duplicated by adopting the system described above, the distance between main and sub external storage control devices becomes large considering the back-ups necessary in case of a disaster. Thus, an optical fiber cable is adopted as the interface cable. Accordingly, the influence of cable delay, which is considered to be constant for a metal cable, with respect to command-chaining time cannot be ignored. However, since this duplication is for back up purposes, the influence of the write process for the sub external storage control device during an ordinary process must be minimized.

In a case where the write command must be executed a number of times in accordance with the command-chaining described above, this command-chaining time required for writing to sub external storage control devices cannot be ignored. This is because the amount of command-chaining between main and sub external storage control devices increases. As a result, backup processing can severely decrease the throughput rate in ordinary processing.

Thus, one purpose of the present invention is to optimize the write process time for the sub external storage control device by taking into consideration the command-chaining time between main and sub external storage control devices. As a result, the present invention offers a means for achieving excellent performance even under the conditions explained above.

In order to achieve the above-mentioned purpose, the external storage control device according to the present invention is equipped with a means for estimating command-chaining time between main and sub external storage control devices. There is also provided a means for estimating the time for a write process to a sub external storage control device before starting the write process to the sub external storage control device. The command is issued to the main external storage control device from the host. The present invention also includes means to select the best suited command-chaining method. Thus, a comparison is made between the above-mentioned estimated time with the data processing time required in the case of transferring data for a write record or data of plural tracks including a write record in one operation using a specified command. The present invention also includes command means for writing said data in a single operation.

It is possible for an external storage device to learn of the command-chaining time mentioned above by either measuring the command-chaining time from a specified command to the next command, or by setting the length of interface cable between main and sub external storage control devices from outside in advance. On the other hand, the time required for a write process for the sub external storage control device can be calculated by the above-mentioned information and by the information included in the command issued to the main external storage control device. Namely, command-chaining used for data input/output includes at least two specific channel commands prior to the command to start data transfer. For example, for an external storage control device, the commands, "DEFINE EXTENT" and "LOCATE RECORD", are issued prior to data transfer, and the number of records to be processed and the data length are given, so that the amount of data to be transferred can be calculated.

Furthermore, the command-chaining time between main and sub external storage control devices depends upon length of interface cable and the performance of the external storage control device, and does not depend on commands made before and after the command-chaining. Accordingly, command-chaining time during data transfer can be estimated by measuring the time for two command chains. Also, the length of interface cable between main and sub external storage control devices, and support functions of a given external storage control device are known at the time of installation of a backup system. Thus, command-chaining time can be estimated with the length of interface cable as established.

Since the command-chaining time can be estimated as mentioned above, the processing time can also be estimated for a given amount of data transfer in the case that the command-chaining command from the channel device is issued to the sub external storage control device. Consequently, by comparing this processing time with a processing time in the case of transferring data for a write record, or, data of plural tracks including a write record together, using a command and command means to write said data at once, the best suited command-chaining instruction can be issued to the sub external storage control device.

Also, the external storage control device according to the present invention is equipped with means to confirm that the object data exists in the data buffer of another external storage control device in order to transfer data from the data buffer within the external storage control device to an external storage control device that receives the write commands, in addition to data transfer means as mentioned above. Moreover, the processing time can be further reduced by transferring all the physical data together, including the control byte and the check byte in the data buffer.

Additionally, in the case where object data for the read command, received from the host, exists in the buffer of an external storage control device other than the external storage control device which has received the read command, the processing time for performing a read-out can be shortened by transferring these data to the external storage control device which received the read command instead of accessing the other external storage device.

These and other objects, features and advantages of the present invention will become more apparent in view of the following detailed description of the preferred embodiments.

DETAILED DESCRIPTION OF THE PREFERRED EMBODIMENTS

Figure 1:
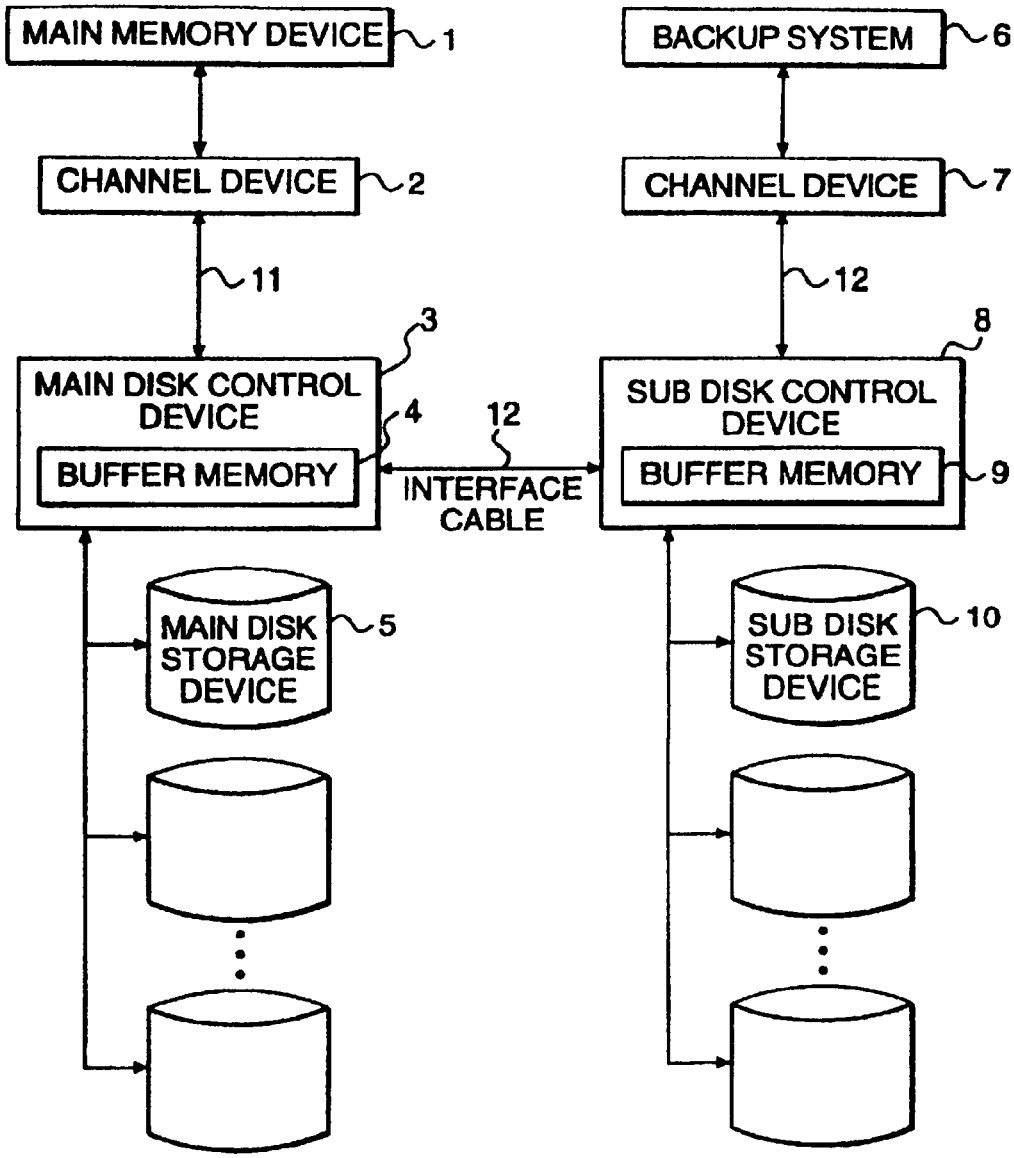
FIG. 1 illustrates a configuration of the data processing system according to an embodiment of the present invention.

The preferred embodiments of the present invention will now be described in conjunction with the Figures. FIG. 1 illustrates a configuration diagram of a data processing system according to an embodiment of the present invention. This data processing system includes a main memory device 1, a channel device 2, a backup system 6 and a channel device 7. This data processing system also includes a main disk control device 3 equipped with a buffer memory 4, and a main disk storage device 5, and also includes a sub disk control device 8 equipped with a buffer memory 9, and a sub disk storage device 4. The channel device 2 is connected to the main disk storage control device 3 through an interface cable 11, the main disk storage control device 3 is connected to the sub disk storage control device 8 through an interface cable 12. Interface cables are also used to interconnect other elements shown in this Figure. Preferably, optical fiber cables are used as the interface cables.

Figure 2:
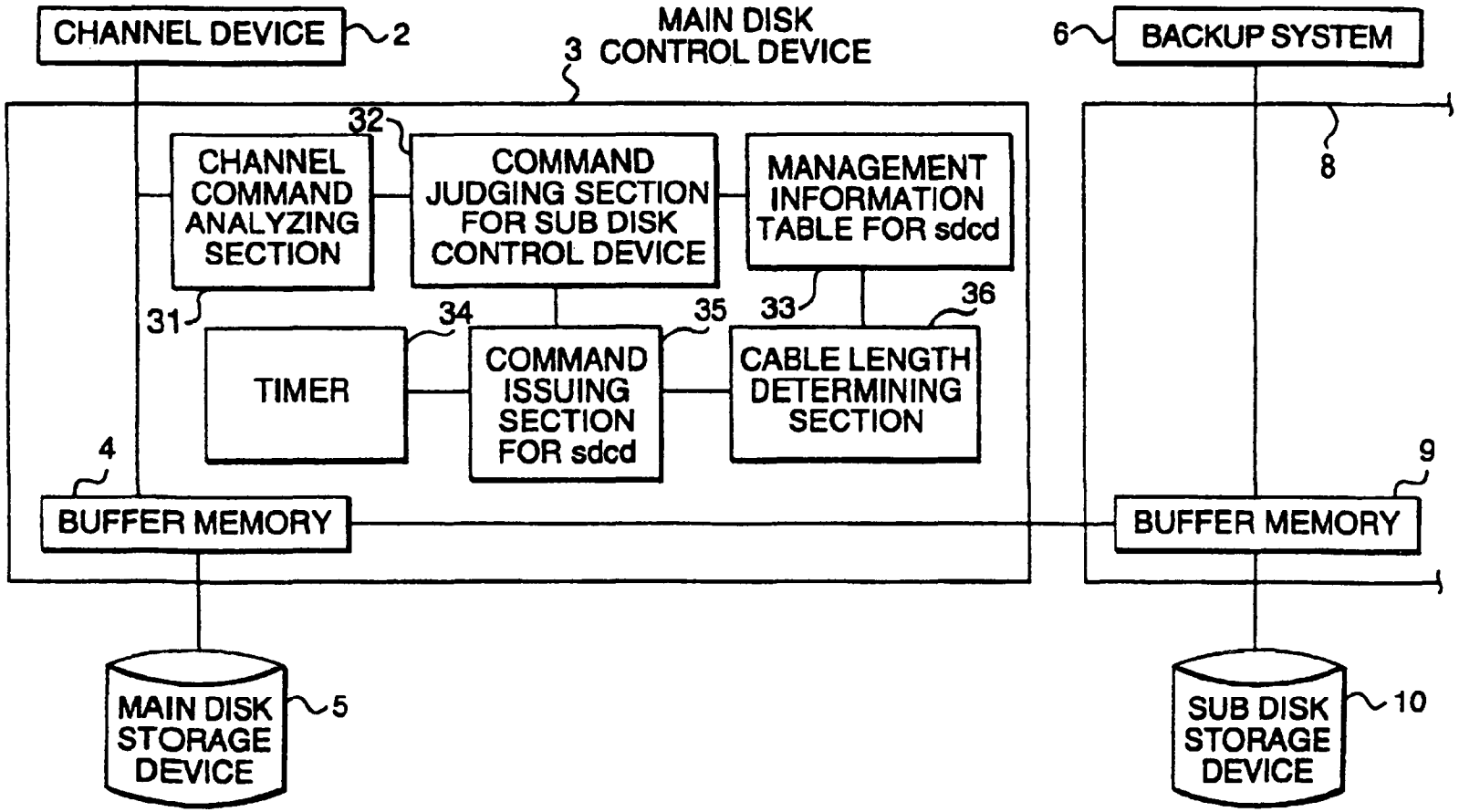
FIG. 2 illustrates a configuration of the main disk control device according to an embodiment of the present invention.

As shown in FIG. 2 the main disk control device 3 includes a channel command analyzing section 31, a command judging section for judging commands to be issued to the sub disk control device 32, a management information table for the sub disk control device 33, a timer 34, a command issuing section for the sub disk control device 35, and a section for interpreting cable length and the function of the sub disk control device 36. Function blocks 31 33, 35 and 36 are realized by a micro-program executed by a microprocessor contained in the disk control device 3. Timer 34 is a hardware counter that is counted up according to a constant period. The sub disk control device 8 is constructed similarly to main disk control device 3.

The command-chaining time required between main and sub external storage control devices is measured in the main disk control device 3, by using the timer 34, the section for issuing command to the sub disk control device 35, and the section for interpreting cable length and function of the sub disk control device 36. Then, the command chaining time, Tsg, is measured when a command is processed once a pair of main and sub disk storage devices are established. The measuring is performed by timer 34 and is stored in the management information table 33 in the main disk control device 3.

The main disk control device obtains support function level information of the sub disk control device when the pair of main and sub disk storage devices is established. This function level information is stored in the management information table of the main disk control device. This stored information is used to judge whether a write command to write data for write record, or, data of plural tracks including the write record can be accepted by the sub disk storage control device or not.

If the command judgment section for the sub disk control device 32 has judged from the support function level information that a specified command is not acceptable, when a write command is received from the channel device 2, the section for issuing command to the sub disk control device 35 unconditionally issues a command-chain sent from the channel device to the sub disk control device. Thus, the system is rendered more versatile in that it can connect even with a conventional device that does not support these functions.

The channel command analyzing section 2 operates as follows. When the channel device 2 issues a write command to the main disk control device 3, the channel command analyzing section 31 determines whether or not the write command is for a disk storage device that forms a pair with the main disk control device 3.

Figure 6:
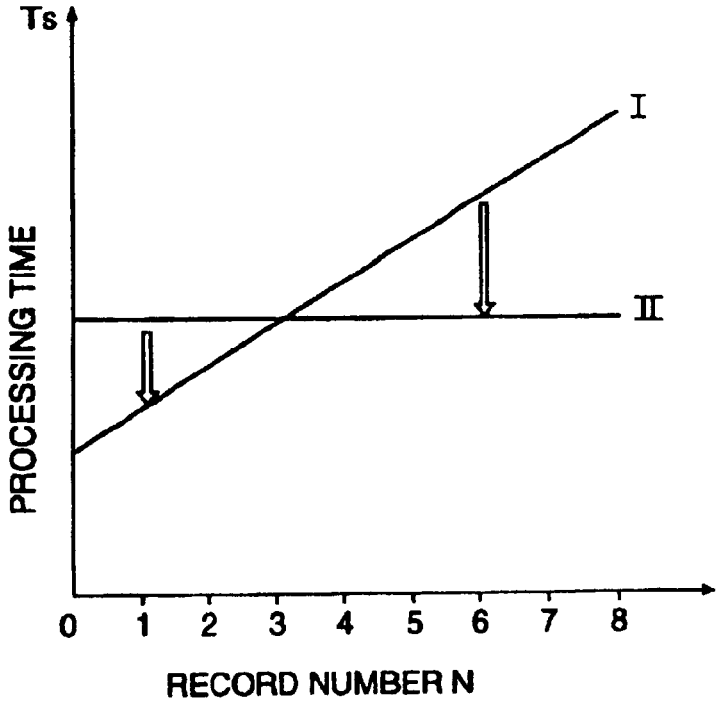
FIG. 6 illustrates a graph showing the relation between number of records transferred and the processing time.

FIG. 6 is a graph illustrating command-chaining time for two separate cases. One case corresponds to the processing time required for transfer of data for one track including a write record. The information from the management information table for the sub disk control device 33 is used, as is the number of transfer records of LOCATE command, the number N which is analyzed by the channel command analyzing section 31, and average record length, L. Here, the straight line (I) can be explained by an equation as shown below using known values of command chaining time Tsg between the main and sub external storage control devices, the above analysis, and the data transfer velocity V between the main and sub external storage control devices 3 and 8.

$$Ts=NL/V+(N-1)Tsg \quad (1)$$

The straight line (II) shows the transfer time Ts', which is a constant value, for the case where data of one track is transferred together and where each record length is L, and number of records in a track is Na. Ts'can be represented by the following formula.

$$Ts'=NaL/V+Tsg \quad (2)$$

In the case of the sloped line (I), as the number of records increases, the processing time increases. At some point, i.e. for some number of records, it is faster to send the entire track of data, because the command chaining time Tsg is too great.

The section for judging commands to be issued to the sub disk control device 32 judges whether to issue the command chain to the sub disk control device as received from the channel device or to transfer data of one track all together based upon the information contained in FIG. 6, in view of the number of records N.

Figure 4:
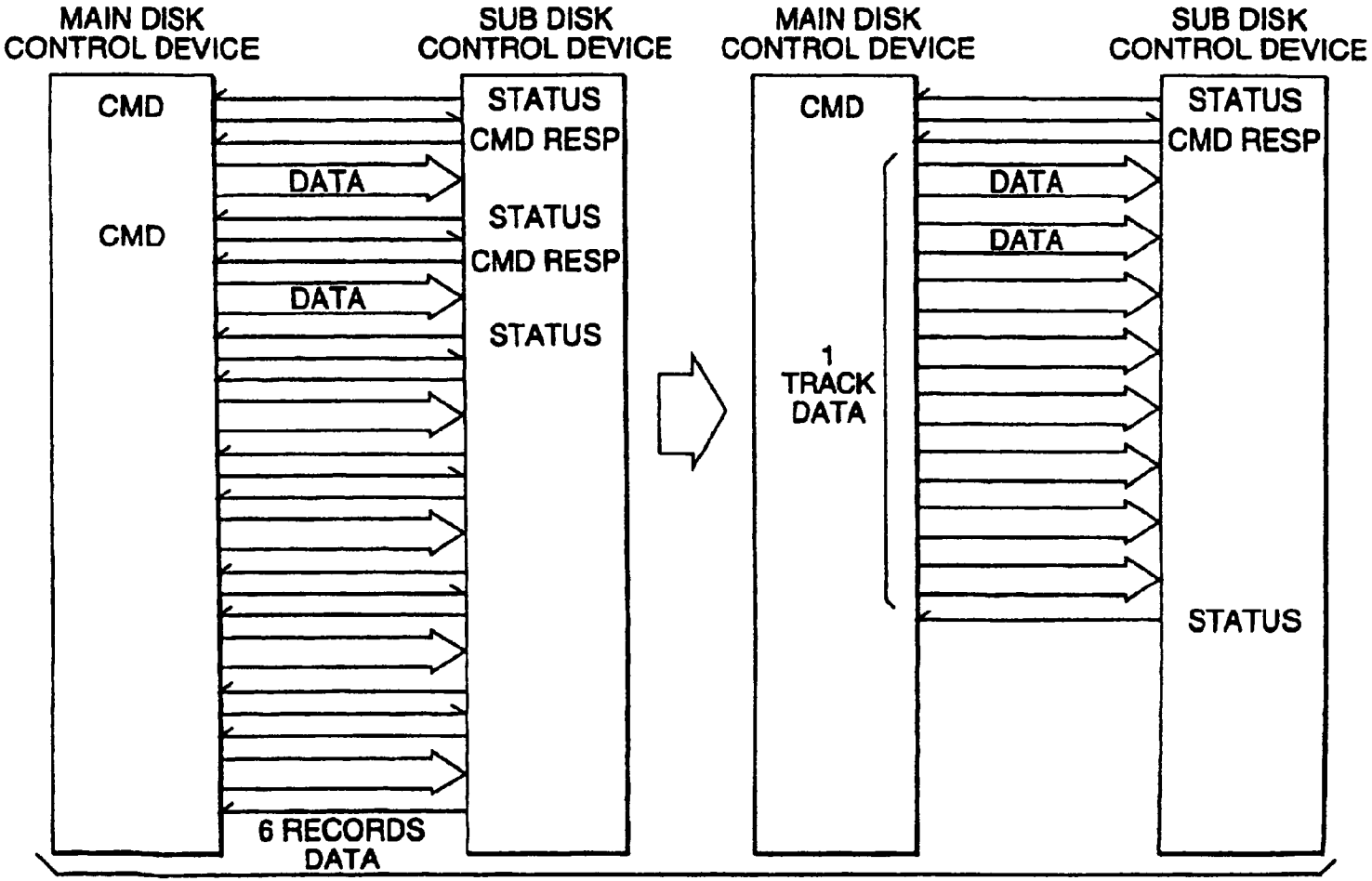
FIG. 4 illustrates the data flow in the case that data are transferred between the main and sub disk control devices record by record or in an entire track.
Figure 5:
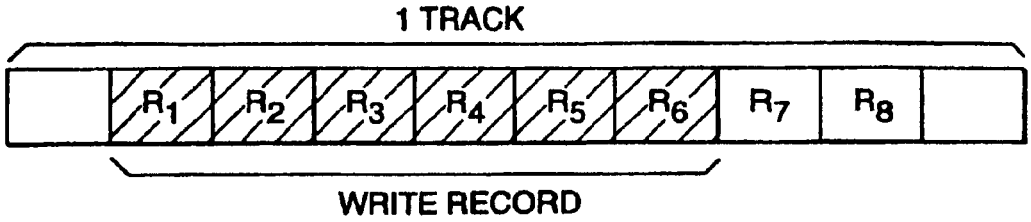
FIG. 5 illustrates data format in the data buffer of a disk control device for the case of 8 records per track.

FIGS. 5 and 6 illustrate a case in which six records are to be written in a track that holds eight records of data. As seen from FIG. 4, transferring data of one track all together requires less processing time if the number of records is greater than 4. FIG. 6 also illustrates such a relationship according to the intersection of lines I and II. Command issuing section 35 issues the best suited command-chain to the sub disk control device 8, in view of all of the considerations mentioned above and according to the instruction of command judgment section 32.

Figure 3:
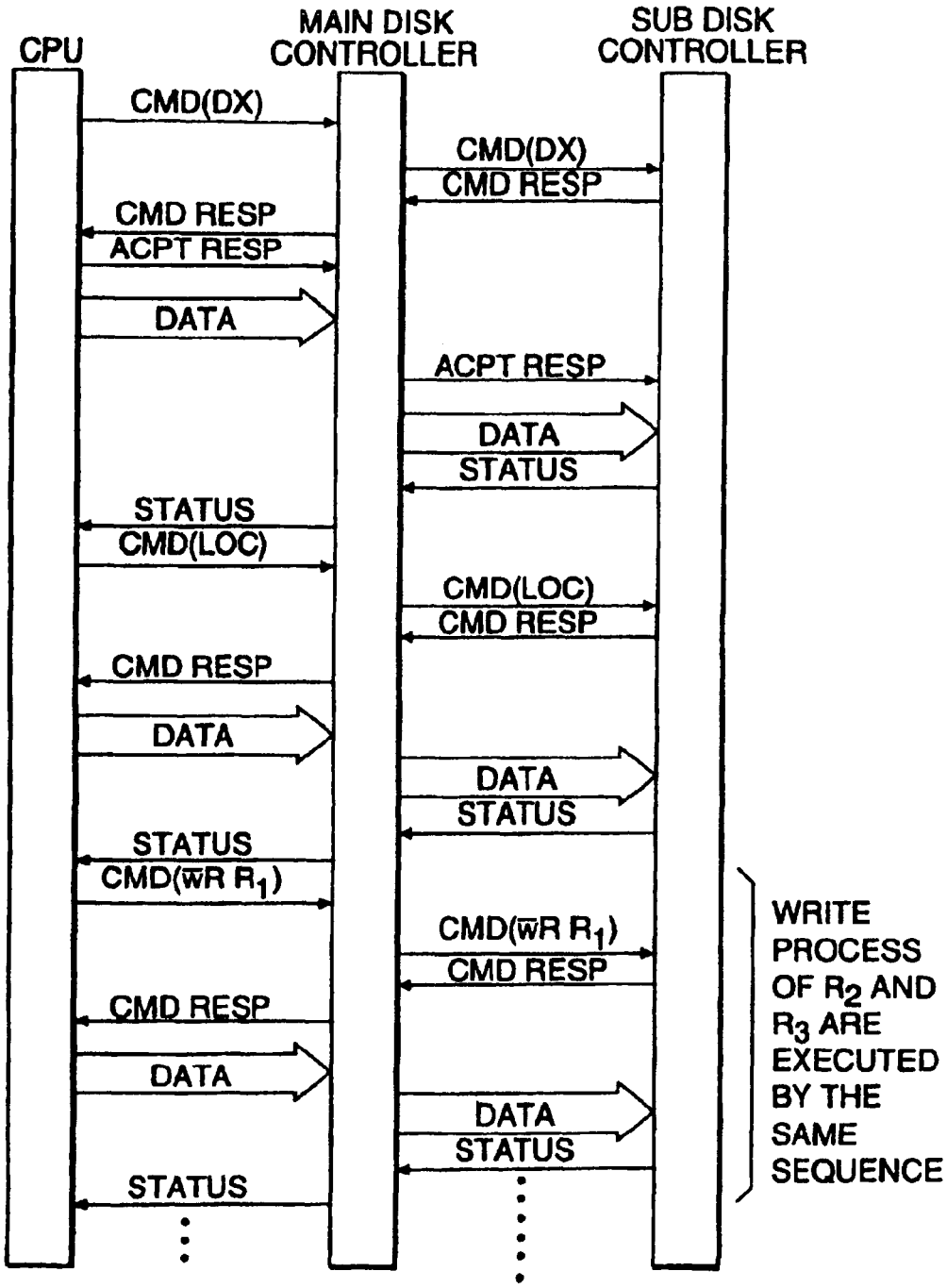
FIG. 3 illustrates the data flow between the channel device, that is a host, the main disk control device, and the sub disk control device.

FIG. 3 illustrates command chaining between a CPU (channel device or host) and a sub disk controller via a main disk controller. As shown, a number of commands have to be sent back and forth before a record (R1) can be transmitted. The same sequence is followed for subsequent records.

According to the present invention, write processing time to a sub disk storage device, i.e. back-up processing time, can be minimized by selecting a command-chain method to be issued to the sub disk control device. This is accomplished by comparing processing time for the case of issuing the command chain to the sub disk control device as received from the channel device with that of the case of transferring data for a write record, or, data of plural tracks including a write record all together.

Figure 7:
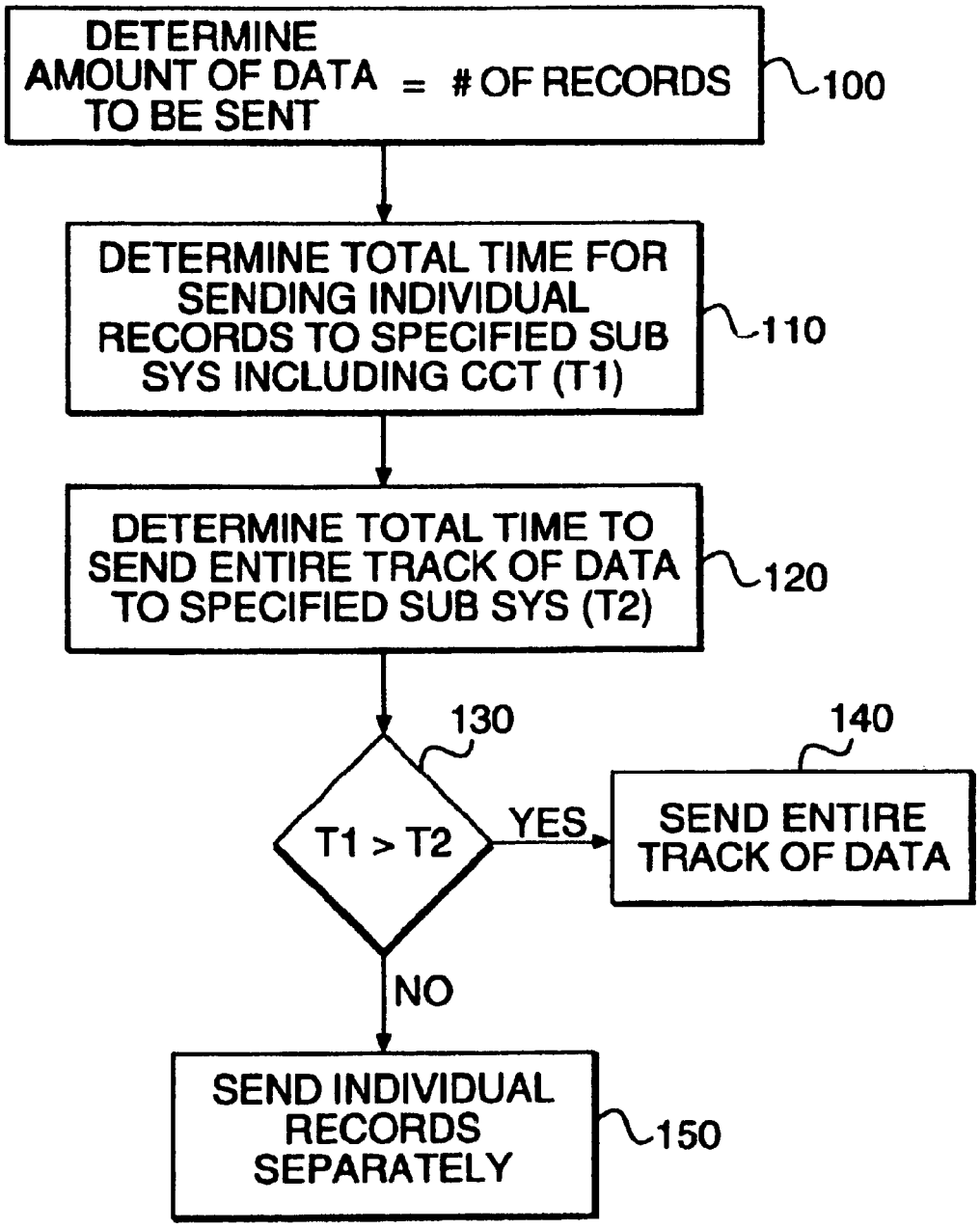
FIG. 7 illustrates a flow chart representing steps followed according to an embodiment of the present invention.

FIG. 7 illustrates the flow of steps according to the present invention. First, the amount of data that is to be sent is calculated (STEP 100), i.e. the number of records. Then a time T1 is calculated (STEP 110). T1 is equal to Ts using equation (1) above, and is computed for the case of sending individual records. Then, a time T is calculated (STEP 120). T2 is equal to Ts'using equation (2) above, and is computed for the case of sending the entire track of data. In decision block 130, it is determined if T1>T2. If so, then the entire track of data is sent (STEP 140). If not, then the individual records are sent separately (STEP 150). This process is repeated as necessary.

Although the present invention has been described above in connection with the preferred embodiments, one of ordinary skill in the art would be enabled by this disclosure to make various modifications to the preferred embodiments and still be within the scope and spirit of the present invention as embodied in the appended claims.

What is claimed is:

1. A first external storage control device which is connected to a first group of external storage devices and controls data transfer between said first group of external storage devices and a host, wherein said first external storage control device is connected to a second external storage control device which is connected to a second group of external storage devices;

said first external storage control device being equipped with a storing means that stores write data transferred by a write command from the host and means that transfers the write data stored in said storing means to the second external storage control device according to a write command;

the first external storage control device also having means for storing the write data to both an external storage device belonging to said first group of external storage devices and to an external storage device belonging to said second group of external storage devices;

means for estimating the command-chaining time between said first and second external storage control devices;

means for estimating a time for a write process, including said estimated command-chaining time, to one of said second group of external storage devices; and command means for writing data in the write process in a single operation;

wherein in a case where said first external storage control device has received plural write commands for said data from the host, said first external storage control device transfers said write data to said second external storage control device by selecting a transfer method with the shortest processing time; said transfer method with the shortest processing time is selected by considering the command-chaining time between said first external storage control device and said second external-storage control device; and said means for estimating a time for a write process estimates the time before starting the write process to said second external storage control device according to said selected transfer method.

2. A first external storage control device according to claim 1, wherein said means for estimating the command-chaining time estimates according to one of (a) measuring the command-chaining time between a specified command to the next command and (b) setting a length of interface cable between the first and second external storage control devices in advance.

3. A first external storage control device according to claim 1, wherein said means for estimating the command-chaining time estimates the command-chaining time by measuring the time for two command chains.

4. A first external storage control device which is connected to a first group of external storage devices and to a second external storage control device, and which controls data transfer between said external storage devices and a host, wherein, the second external storage control device is connected to a second group of external storage devices, and controls data transfer between said second group of external storage devices and the host, said first external storage control device being equipped with a storing means that stores write data transferred through a write command from the host, a first transfer means to transfer write data to said second external storage control device for each of plural write commands received from the host, and a second transfer means which transfers write data from the host to the second external storage control device for each of plural write commands received from the host by using only one write command, and the first external storage control device also including means for calculating processing time for data transfer between said first external storage control device and said second external storage control device using said first transfer means and using said second transfer means, means to compare said two processing times and for storing the same data to an external storage device belonging to said first and second group of external storage devices;

wherein when said first external storage control device has received plural write data commands from the host, the external storage control device transfers data from said first external storage control device to said second external storage control device, using a transfer means having the smaller processing time according to the result of said comparing means; and wherein said transfer means having the smaller processing time is selected by considering the command-chaining time between said first external storage control device and said second external storage control device.

5. A first external storage control device according to claim 4, further comprising:

means for estimating the command-chaining time between said first and second external storage control devices; and means for estimating a time for a write process, including said estimated command-chaining time, to one of said second group of external storage devices, before starting the write process to said second external storage control device according to said selected transfer means.

6. A first external storage control device according to claim 5, wherein said means for estimating the command-chaining time estimates according to one of (a) measuring the command-chaining time between a specified command to the next command and (b) setting a length of interface cable between the first and second external storage control devices in advance.

7. A first external storage control device according to claim 5, wherein said means for estimating the command-chaining time estimates the command-chaining time by measuring the time for two command chains.

8. A first external storage control device which is connected to a first group of external storage devices and a host processor, and which controls data transfer between said first group of external storage devices and said host processor, wherein said first external storage control device is connected to a second external storage control device that exists a large distance away from said first external storage control device, and which is connected to a second group of external storage devices;

said first external storage control device is equipped with a buffer memory that stores write data transferred by a write command from said host processor and with a function that transfers said write data stored in said buffer memory to said second external storage control device according to the write command;

said first external storage control device has a function to store said write data to one of said external storage devices in said first group and to one of said external storage devices in said second group;

wherein if said first external storage control device has received plural write commands for said data from said host processor, said first external storage control device transfers said write data to said second external storage control device by selecting a transfer method with the shortest processing time; and wherein said transfer method with the shortest processing time is selected by considering the command-chaining time between said first external storage control device and said second external storage control device.

9. A first external storage control device according to claim 8, further comprising:

means for estimating the command-chaining time between said first and second external storage control devices;

means for estimating a time for a write process, including said estimated command-chaining time, to one of said second group of external storage devices, before starting the write process to said second external storage control device according to said selected transfer method; and command means for writing data in the write process in a single operation.

10. A first external storage control device according to claim 9, wherein said means for estimating the command-chaining time estimates according to one of (a) measuring the command-chaining time between a specified command to the next command and (b) setting a length of interface cable between the first and second external storage control devices in advance.

11. A first external storage control device according to claim 9, wherein said means for estimating the command-chaining time estimates the command-chaining time by measuring the time for two command chains.

*12. A storage system comprising:*

*a first plurality of disk drives; and*

*a disk controller connected to a host processor and said first plurality of disk drives, said disk controller controlling data write from said host processor to said first plurality of disk drives, and data transfer from said first plurality of disk drives to said host processor;*

*wherein said disk controller is arranged to be connected to another disk controller, and to obtain information on a support function of the another disk controller.*

*13. A storage system according to claim 12, wherein said disk controller includes means for obtaining the information on the support function of the another disk controller from the another disk controller.*

*14. A storage system according to claim 13, wherein said disk controller establishes a pair of disk drives, said pair including one of said first plurality of disk drives and one of a second plurality of disk drives which are controlled by the another disk controller; and*

*wherein said obtaining means obtains the information on the support function of the another disk controller from the another disk controller when said pair of disk drives is established.*

*15. A storage system according to claim 12, wherein said disk controller includes a management table for storing the information on the support function of the another disk controller.*

*16. A storage system according to claim 15, wherein said disk controller further includes means for obtaining the information on the support function of the another disk controller from the another disk controller.*

*17. A storage system according to claim 16, wherein said disk controller establishes a pair of disk drives, said pair*

*including one of said first plurality of disk drives and one of a second plurality of disk drives which are controlled by the another disk controller; and*

*wherein said obtaining means obtains the information on the support function of the another disk controller from the another disk controller when said pair of disk drives is established.*

*18. A storage system according to claim 16, wherein said disk controller stores the information on the support function of the another disk controller, which information is obtained from the another disk controller by said obtaining means, in said management table.*

*19. A storage system according to claim 12, wherein said disk controller controls issuance, to the another disk controller, of information that is different according to the support function of the another disk controller.*

*20. A storage system according to claim 19, wherein said disk controller performs a control according to a first support function of the another disk controller if the another disk controller has the first support function.*

*21. A storage system according to claim 19, wherein said disk controller controls issuance, to the another disk controller, of information that does not correspond to a second support function, if the another disk controller does not have the second support function.*

*22. A storage system according to claim 19, wherein said disk controller includes a function determining section for judging the support function of the another disk controller.*

*23. A storage system according to claim 22, wherein said disk controller includes a management table for storing the information on the support function of the another disk controller.*

*24. A storage system according to claim 23, wherein said disk controller further includes means for obtaining the information on the support function of the another disk controller from the another disk controller.*

*25. A storage system according to claim 24, wherein said disk controller establishes a pair of disk drives, said pair including one of said first plurality of disk drives and one of a second plurality of disk drives which are controlled by the another disk controller; and*

*wherein said obtaining means obtains the information on the support function of the another disk controller from the another disk controller when said pair of disk drives is established.*

*26. A storage system according to claim 24, wherein said disk controller stores the information on the support function of the another disk controller, which information is obtained from the another disk controller by said obtaining means, in said management table.*

*27. A storage system according to claim 26, wherein said function determining section judges the support function of the another disk controller in accordance with the information on the support function of the another disk controller in said management table.*

*28. A storage system according to claim 19, wherein said disk controller does not issue a specified command to the another disk controller, if said disk controller judges from the information on the support function of the another disk controller that the another disk controller does not accept the specified command.*

*29. A storage system comprising:*

*a first plurality of disk drives; and*

*a disk controller connected to a host processor and said first plurality of disk drives, said disk controller controlling data transfer from said first plurality of disk drives to said host processor;*

*wherein said disk controller is connected to another storage system, and said disk controller transfers a read command, received from the host processor, to the another storage system, in the case where object data for the read command exists in the another storage system,*

*wherein said disk controller controls data write from said host processor to said first plurality of disk drives, and*

*wherein said disk controller confirms that object data for the read command or a write command received from the host processor exists in the another storage system, and transfers the read command or the write command to the another storage system.*

* * * * *